Jan. 9, 1934.  V. E. NELSON  1,942,567
DUSTGUARD
Filed Oct. 20, 1931
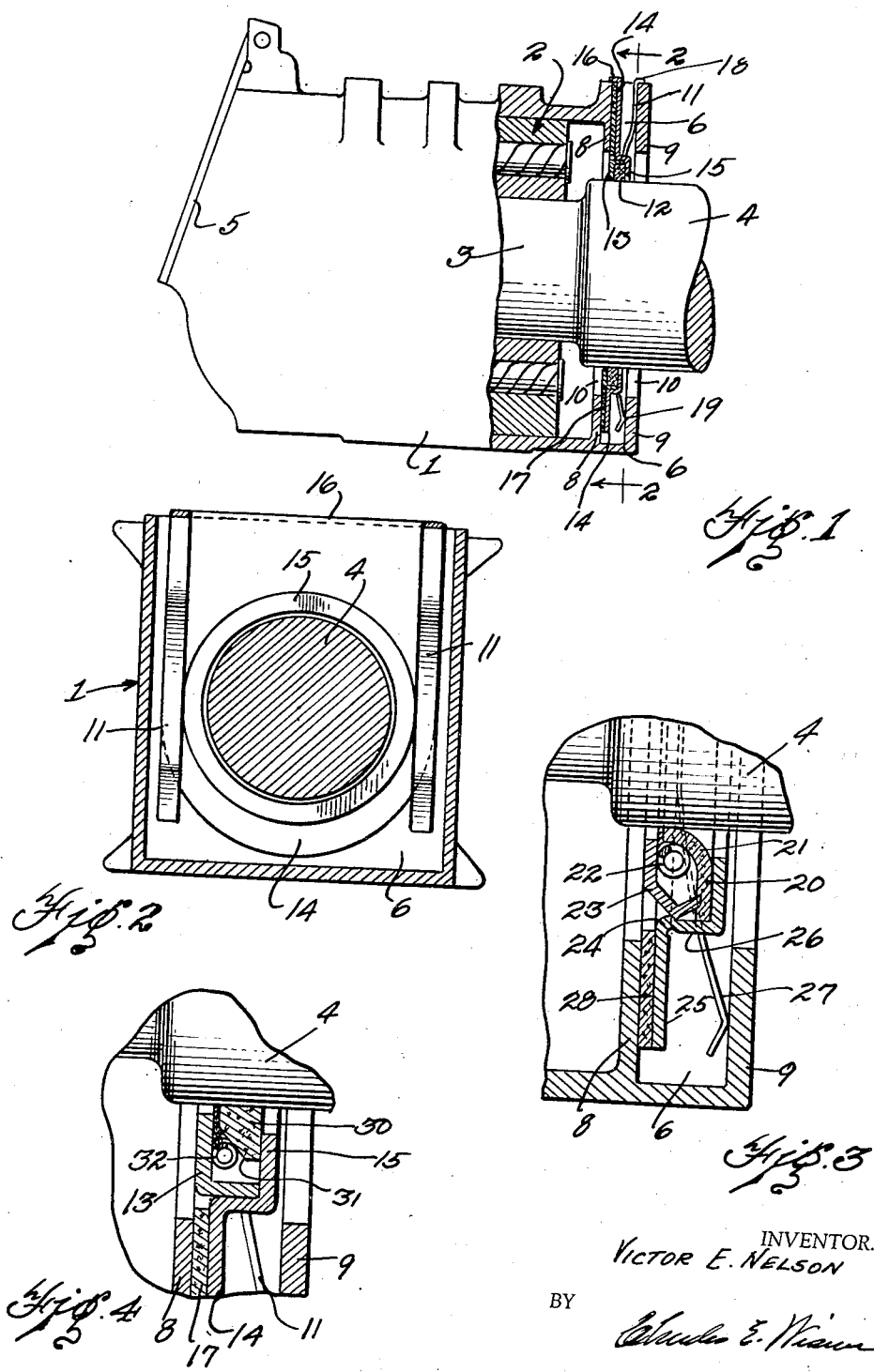
INVENTOR.
VICTOR E. NELSON
BY
ATTORNEY.

Patented Jan. 9, 1934

1,942,567

UNITED STATES PATENT OFFICE 1,942,567

DUSTGUARD

Victor E. Nelson, Pontiac, Mich., assignor to Universal Oil-Seal Company, Pontiac, Mich., a corporation of Michigan Application October 20, 1931. Serial No. 569,965

6 Claims. (Cl. 286—6)

This invention relates to dust guards for car journal boxes and an object of the invention is in the provision of a cheap and efficient dust and oil guard which will prevent dust from entering the bearings in the journal box and which will seal against the egress of oil therefrom.

Another object of the invention is in the provision of a dust guard which is so constructed as to automatically take up wear of the packing surrounding the axle shaft.

Another object of the invention is in the provision of a dust guard comprising a two piece packing member one of the same adapted to seal the interstices between the end wall of the journal box and the metal portion of the dust guard and the other adapted to closely engage the axle shaft to close the interstice between the shaft and the metal portion of the guard.

Another object of the invention is in the provision of a dust and oil guard in which the packing member adapted to close the interstice between the end wall of the journal box and the metal portion of the dust guard is held thereagainst under spring pressure. The springs so designed and positioned as to permit them to be placed in position after the axle has been assembled in the journal box and dust guard thereby preventing injury to the packing face of the dust guard.

These objects and the several novel features of the invention are hereinafter more fully described and claimed and the preferred form of construction by which these objects are attained is shown in the accompanying drawing in which—

Fig. 1 is an elevational view of a journal box partly in section embodying my improved dust guard.

Fig. 2 is a section taken on line 2—2 of Fig. 1.

Fig. 3 is an enlarged detail sectional view showing a modified form of dust guard.

Fig. 4 is a similar view of another modification.

Referring to the drawing the journal box 1 is of standard construction and is provided with the bearings 2 which support the reduced end 3 of the axle shaft 4. The outer end of the journal box is closed by the cover 5 as is the usual custom while the inner end wall 7 of the box is provided with the usual recess 6 in which a dust guard is adapted to be inserted. It will be noted that the aperture 6 forms the flanges 8 and 9 both being apertured at 10 to receive the axle shaft 4. It is the usual custom to core the aperture 6 in the journal box casting 1 and the walls of the same are not as a rule machined or finished. It is therefore an object of this invention to provide a dust guard which may be slipped in place to receive the axle 4 without having the packing which engages against the face of the flange 8 come in contact therewith until the same is brought into straight pressure contact therewith. This is accomplished by inserting the leaf springs 11 in the aperture after the dust guard has been assembled with the axle. As shown in Figs. 1 and 2 the dust guard comprises the packing member 12 of ring like form the inside diameter of the same of a size to closely encircle the axle 4.

A cup shaped member 13 is positioned against one face of the packing member 12 and the cylindrical portion of the same engages the outer periphery of the packing ring. A sheet metal plate 14 is provided with a circular depressed portion 15 which engages the opposite face of the packing ring 12 and the cylindrical portion is preferably pressed on the cylindrical portion of the cup shaped member 13. The upper edge of the member 14 is provided with a bent portion 16 which engages over the solid portion of the end wall 6. A packing member 17 is suitably secured to the face of the member 14, adjacent the flange 8, and is preferably made of cork or the like. The springs 11 are provided at their upper ends with the inturned portions 18 which engage over the edge of the flange 9 and the intermediate portion of the springs 11 are adapted to engage against the flat portion of the member 14 and hold the packing 17 tightly against the face of the flange 8 to prevent dust from entering the journal box or to prevent oil in the journal box from leaking therefrom. The lower end of the springs 11 are each provided with the portion 19 abutting the flange 9 and due to the roughness of the wall of the flange 9 the portion 19 of the springs 11 engaging therewith will help prevent the springs from being shaken out of place. It will thus be seen that the packing ring 12 will seal the interstices between the axle 4 and the metal portion of the dust guard while the packing 17 will seal the interstices between the flange 8 and the metal part of the dust guard.

Referring to Fig. 3 the packing ring 20 is provided with a curved portion 21 which closely engages the periphery of the axle 4 and a circular coiled spring 22 is snapped in place over the portion 21 and holds the same in spring pressure contact with the axle. It will be noted that as the packing 21 wears the spring 22 will always keep the packing in contact with the axle shaft. A sheet metal ring 23 prevents displacement of the spring 22 and the ring is held in position by the detents 24 formed at the juncture between the flap portion 25 and the depressed portions 26. The springs 27 are identical with the springs 11 heretofore described and are adapted to press against the portion 25 to hold the packing member 28 in surface contact with the flange 8.

Referring to Fig. 4 the structure is quite similar to that as shown in Fig. 1 but in this case the packing ring 30 is beveled at 31 and a circular coiled spring 32 engages against the beveled face 31 and against the face of the cup shaped member 13. It will thus be seen that the spring 32 will not only hold the packing ring 30 in close contact with the axle 4 but will also press the straight face of the same against the depressed portion 15 of the member 14 thereby forming a seal to prevent egress of oil from the journal box 1 or ingress of dust and dirt into the journal box.

In assembling the device the dust guard is slipped into place in the aperture 6 and since the width of the dust guard is less than the width of the aperture the packing 17 is not brought into contact with the flange 8 until the dust guard is in position to receive the axle. The same can then be moved over until the bent end 16 engages over the upper edge of the journal box. The axle 4 will then be assembled with the journal box and the springs 11 slipped down through the open end of the aperture 6 and into place to bind the packing 17 tightly against the flange 8. The structures shown in Figs. 3 and 4 will both be assembled with the axle and journal box in a similar manner.

From the foregoing description it becomes evident that I have provided an efficient dust guard for journal boxes so designed as to automatically take up the wear between the packing ring and the axle and which is relatively cheap to manufacture and easy to assemble in place in the journal box.

Having thus fully described my invention, its utility and mode of operation, what I claim and desire to secure by Letters Patent of the United States is—

1. A dust guard for use with a shaft and journal box having spaced end walls apertured to receive the shaft, comprising an apertured flat sheet metal plate recessed at the aperture, an L shaped ring for positioning in the recess, a packing ring between said L shaped ring and the base of the recess and engaging the shaft, a packing in sheet form on one face of the plate about the recess, and spring means for holding the packing and plate against one of the walls of the recess.

2. A dust guard for use with a shaft and journal box having spaced end walls apertured to receive the shaft, comprising an apertured flat sheet metal plate, the aperture of the plate being less in diameter than the diameter of the apertures in the said walls, the said plate having the body thereof pressed outward from the plane of the plate providing a shouldered recess at the aperture, a packing ring in the said recess, a metal retaining ring therefor L shaped in cross section fitting the peripheral wall of the recess of the plate, a flat sheet packing material on the face of the plate and extending from the recess outwardly thereof, and spring means for pressing the plate and holding the sheet packing member against the inner wall of the recess.

3. A dust guard for use with a shaft and journal box therefor having a pair of spaced end walls apertured to receive the shaft, comprising an apertured flat, sheet metal plate for introduction into the space between the said end walls, means for locating the aperture of the plate practically in axial alignment with the said apertures of the end walls, said plate having a recess provided by depressing a portion thereof peripherally about the aperture, a packing ring in said recess for engagement with the shaft, a flat sheet of packing material on the face of the plate through which the recess opens, and a spring device manually insertible into or removable from the space between the end walls adapted and when in position in said space maintaining the said sheet of packing in pressure engagement with the inner face of the inner end wall.

4. A dust guard for use with a shaft and journal box therefor having a pair of spaced end walls apertured to receive the shaft, comprising a flat apertured plate for introduction into the space between said end walls, said plate having a flange at one edge fitting over the edge of the inner of said end walls at the opening therebetween, said plate further having a circular recess at the aperture, a ring member L shaped in cross section forming a press fit in the recess of the plate, a packing ring supported in said recess by the said L shaped ring, a packing element on the face of the plate at the flanged side, and a pair of manually removable springs adapted to be inserted in the recess on opposite sides of the recessed portion of the plate to maintain the said packing element in engagement with the inner face of the inner of said end walls.

5. A dust guard for use with a shaft and a journal box therefor having a pair of spaced end walls apertured to receive the shaft, comprising an apertured sheet metal plate for introduction into the space between the said end walls, said plate having a recess provided by depressing a portion thereof peripherally about the aperture to one side of the plane of the plate, a packing ring therein having a flexible portion thereof engaging about the shaft, a retainer for said packing ring comprising a ring like element fitting in tight engagement with the peripheral wall of the recess, a radially contracting spring in the space between the bottom of the said recess and the packing retaining ring for holding the packing in engagement with the shaft, a sheet of packing material on the face of the plate through which the recess opens, and spring means acting on said plate to hold the said flat sheet of packing in contact with the inner face of the inner end wall of said pair.

6. A dust guard for use with a shaft and a journal box therefor having a pair of spaced end walls apertured to receive the shaft, comprising an apertured plate for introduction into the space between the said end walls, the said plate having a portion thereof adjacent the aperture pressed outwardly from the plane of the plate providing a recess opening through one face of the plate, a ring like metal element fitting in the said recess providing with the wall thereof a hollow annulus, a packing ring in said hollow annulus, a contracting spring engaging the said packing to maintain the same in contact with the shaft, a sheet of packing material on the face of the plate through which the recess opens, and spring means engaging the plate and holding the said sheet of packing in contact with the inner face of the inner wall of said pair.

VICTOR E. NELSON.